US 8,849,611 B2

Sep. 30, 2014

(12) United States Patent
Haviland et al.

(10) Patent No.: US 8,849,611 B2
(45) Date of Patent: Sep. 30, 2014

(54) INTERMODULATION SCANNING FORCE SPECTROSCOPY

(75) Inventors: David B. Haviland, Bromma (SE); Erik Tholen, Sundbyberg (SE); Daniel Platz, Stockholm (SE); Carsten Hutter, Sveavägen (SE); Hans Hansson, Solna (SE)

(73) Assignee: Intermodulation Products AB (SE)

( * ) Notice: Subject to any disclaimer, the term of this patent is extended or adjusted under 35 U.S.C. 154(b) by 387 days.

(21) Appl. No.: 12/744,637

(22) PCT Filed: Nov. 26, 2008

(86) PCT No.: PCT/EP2008/066247
§ 371 (c)(1),
(2), (4) Date: Aug. 19, 2010

(87) PCT Pub. No.: WO2009/068568
PCT Pub. Date: Jun. 4, 2009

(65) Prior Publication Data
US 2010/0312495 A1 Dec. 9, 2010

Related U.S. Application Data

(60) Provisional application No. 60/990,518, filed on Nov. 27, 2007, provisional application No. 61/096,370, filed on Sep. 12, 2008.

(51) Int. Cl.
*G01B 5/28* (2006.01)
*G01Q 60/34* (2010.01)
*G01Q 30/04* (2010.01)
*B82Y 35/00* (2011.01)

(52) U.S. Cl.
CPC ........... *G01Q 60/34* (2013.01); *B82Y 35/00* (2013.01); *G01Q 30/04* (2013.01)
USPC ................................. 702/167; 250/234

(58) Field of Classification Search
CPC .................................................. G01B 21/20
USPC ................................................... 702/167
See application file for complete search history.

(56) References Cited

U.S. PATENT DOCUMENTS 5,412,980 A    5/1995  Elings et al.
5,519,212 A *  5/1996  Elings et al. ............... 250/234

(Continued)

FOREIGN PATENT DOCUMENTS

WO    WO-2004/057303 A2    7/2004

OTHER PUBLICATIONS

"International Application Serial No. PCT/EP2008/066247, International Search Report mailed Apr. 9, 2009", 7 pgs.

(Continued)

*Primary Examiner* — Patrick Assouad
*Assistant Examiner* — Haidong Zhang
(74) *Attorney, Agent, or Firm* — Schwegman Lundberg & Woessner, P.A.

(57) ABSTRACT

We have invented a method of sensing a surface by driving a resonator with two or more frequencies and exploiting the nonlinear phenomenon of intermodulation. When a resonator (for example an oscillating cantilever) with a sharp tip is brought close to a surface, the non-linear tip-surface interaction generates intermodulation response of the resonator. The measured frequency spectrum of intermodulation response contains much information about the material composition of the surface. When the resonator is scanned over the surface, the intermodulation spectrum can be used to make an image of the surface with enhanced contrast for different materials on the surface, or it can be used to extract the tip-surface interaction at every point on the surface.

17 Claims, 11 Drawing Sheets

(56) References Cited

U.S. PATENT DOCUMENTS

| | | | |
|---|---|---|---|
| RE36,488 E | | 1/2000 | Elings et al. |
| 6,935,167 B1* | | 8/2005 | Sahin et al. ................ 73/105 |
| 7,089,787 B2 | | 8/2006 | Sahin et al. |
| 7,302,833 B2 | | 12/2007 | Sahin et al. |
| 2004/0182140 A1* | | 9/2004 | Weide et al. ............... 73/105 |
| 2005/0174130 A1* | | 8/2005 | Bonnell et al. ............ 324/719 |
| 2006/0156798 A1* | | 7/2006 | Mancevski ................. 73/105 |
| 2007/0245815 A1* | | 10/2007 | Proksch ..................... 73/105 |
| 2008/0140343 A1* | | 6/2008 | Roover et al. .............. 702/168 |

OTHER PUBLICATIONS

"International Application Serial No. PCT/EP2008/066247, Written Opinion mailed Apr. 9, 2009", 10 pgs.

Anonymous, "Intermodulation", [online]. [retrieved Feb. 26, 2009]. Retrieved from the Internet: <URL: http://en.wikipedia.org/wiki/Intermodulation>, (2009), 5 pgs.

Crittenden, S., et al., "Probing attractive forces at the nanoscale using higher-harmonic dynamic force microscopy", *Physical Review B*, 72(23), (2005), 235422-1-235422-13.

Platz, D., et al., "Intermodulation atomic force microscopy", *Applied Physics Letters*, 92, (2008), 153106-1-153106-3.

Proksch, R., "Multifrequency, repulsive-mode amplitude-modulated atomic force microscopy", *Applied Physics Letters*, 89(11), (2006), 113121-1-113121-3.

Stark, R. W., et al., "Higher harmonics imaging in tapping-mode atomic-force microscopy", *Review of Scientific Instuments*, 74(12), (2003), 5111-5114.

Stark, R. W., et al., "Tapping-mode atomic force microscopy and phase-imaging in higher eigenmodes", *Applied Physics Letters*, 74(22), (1999), 3296-3298.

Albrecht, T. R., et al., "Frequency modulation detection using high$Q$ cantilevers for enhanced force microscope sensitivity", *Journal of Applied Physics*, 69(2), (1991), 668-673.

Balantekin, M., et al., "Enhanced higher-harmonic imaging in tapping-mode atomic force microscopy", *Applied Physics Letters*, 87(24), (2005), 243513-1-243513-3.

Binnig, G., et al., "Atomic Force Microscope", *Physical Review Letters*, 56(9), (1986), 930-933.

Butt, H.-J., "Measuring local surface charge densities in electrolyte solutions with a scanning force microscope", *Biophys. J.*, 63(2), (1992), 578-582.

Heinz, W. F., et al., "Getting Physical with Your Chemistry: Mechanically Investigating Local Structure and Properties of Surfaces with the Atomic Force Microscope", *Journal of Chemical Education*, 82(5), (2005), 695-703.

Jesse, S., et al., "The band excitation method in scanning probe microscopy for rapid mapping of energy dissipation on the nanoscale", *Nanotechnology*, 18, (2007), 1-8.

Lozano, J. R., et al., "Theory of Multifrequency Atomic Force Microscopy", *Physical Review Letters*, 100, (2008), 076102-1-076102-4.

Martin, Y., et al., "Atomic force microscope—force mapping and profiling on a sub 100Å scale", *Journal of Applied Physics*, 61(10), (1987), 4723-4729.

Martinez, N. F., et al., "Enhanced compositional sensitivity in atomic force microscopy by the excitation of the first two flexural modes", *Applied Physics Letters*, 89, (2006), 153115-1-153115-3.

Pedro, J. C., *Intermodulation Distortion in Microwave and Wireless Circuits*, Artech House, Inc., Norwood, MA, (2003), 447 pgs.

Pesen, D., et al., "Image reversal for direct electron beam patterning of protein coated surfaces", *Lab on a Chip* © 2007 The Royal Society of Chemistry. [online]. [retrieved on Oct. 1, 2007]., (2007), 6 pgs.

Sahin, O., et al., "An atomic force microscope tip designed to measure time-varying nanomechanical forces", *Nature Nanotechnology*, 2, (2007), 507-514.

Sahin, O., et al., "High-resolution imaging of elastic properties using harmonic cantilevers", *Sensors and Actuators A*, 114, (2003), 183-190.

Zhong, Q., et al., "Fractured polymer/silica fiber surface studied by tapping mode atomic force microscopy", *Surface Science Letters*, 290, (1993), L688-L692.

\* cited by examiner

INTERMODULATION SCANNING FORCE SPECTROSCOPY

RELATED APPLICATIONS

This application is a U.S. National Stage Filing under 35 U.S.C. 371 from International Patent Application Serial No. PCT/EP2008/066247, filed Nov. 26, 2008, and published on Jun. 4, 2009 as WO 2009/068568 A1, which claims the priority benefit of U.S. Provisional Application Ser. No. 60/990,518, filed Nov. 27, 2007; and U.S. Provisional Application Ser. No. 61/096,370, filed Sep. 12, 2008, the contents of which applications and publication are incorporated herein by reference in their entirety.

TECHNICAL FIELD

The invention relates to a mode of usage for scanning probe microscopes which exploits resonant sensors to detect a surface. In particular, the invention relates to the dynamic mode of operation of the Atomic Force Microscope (AFM), which uses a small vibrating beam, or cantilever, as the resonator.

BACKGROUND ART

Many modes of Scanning Probe Microscopy are based on resonant detection. Typically an oscillating cantilever having a sharp tip is excited at one of the resonant frequencies of the cantilever. When the tip is brought close to a surface, atomic forces, magnetic forces (if the tip is magnetic), electrostatic forces (if the tip is charged) or other tip-surface interactions are measured by detecting a change in the amplitude and/or phase of the cantilever oscillation. This amplitude and phase change is measured at the same frequency that the cantilever is excited, typically by lock-in methods. In Atomic Force Microscopy (AFM), this type of resonant detection was originally demonstrated by Binnig, Quate and Gerber [B. Binnig et. al, Phys. Rev. Lett. vol. 56, 930 (1986); Y. Martin et al. J. Appl. Phys. vol. 61, 4723 (1987); T. R. Albrecht et al. J. Appl. Phys. vol. 69, 668 (1991)] but today it is frequently called "tapping mode AFM" [Tapping mode AFM is a Veeco trade mark. U.S. Pat. No. 5,412,980, U.S. Pat. No. 5,519,212 (1996), U.S. Pat. Reissue No. RE36,488 (2000); Q. Zhong et al. Surf. Sci. Lett. vol. 290, L668 (1993)], and many variations on this basic method exist, such as Magnetic Force Microscopy (MFM) and others. The oscillating cantilever can be replaced with other types of mechanical resonators to increase the quality factor and frequency of the resonator. The signal to noise ratio with this method is improved when the quality factor of the resonator is increased, and the sensitivity and measurement bandwidth are improved when the frequency of the resonator is increased. To optimize these qualities simultaneously, one desires a resonator which, when it is freely oscillating away from the surface, maintains a response which is as linear as possible for as large an oscillation amplitude as possible.

The Atomic Force Microscope (AFM) has emerged as a key tool in many nanotechnology applications, providing unprecedented contrast for atomic-scale variations in surface topography. In AFM, a cantilever with a sharp tip at the free end is scanned over a surface, and the deflection of the cantilever is measured, typically with the so-called optical lever. A force between the surface and the tip causes the bending of the cantilever (like a spring) which is read out by the optical lever as deflection of the cantilever. If the spring constant of the cantilever is known, and the deflection system is properly calibrated, the force between the tip and the surface can be determined.

AFM can be run in two basic modes: The first mode is a quasi-static mode (also called Contact Mode AFM), where the inertia (effective mass) of the cantilever is neglected in the description of the cantilever dynamics. The second mode is the so-called dynamic mode (also called Tapping Mode AFM), which takes the inertia of the cantilever into account. Dynamic mode AFM exploits a mechanical resonance (typically the fundamental bending mode) of the cantilever to enhance the force sensitivity. This enhanced sensitivity allows for imaging with lower average back-action force on the sample, thereby causing less damage to soft and delicate samples than is the case with quasi-static AFM. However, Dynamic AFM has been limited in its ability to extract information about the chemical or elastic properties of the sample surface. Such information is contained in the so-called force-distance curve (force as a function of tip-surface distance). Force-distance curves can be measured in quasi-static mode by a slow process with limited sensitivity that is not done simultaneously with scanning [W. F. Heinz and H. H. Hoh, J. Chem Educ., vol. 82, 695 (2005), H. J. Butt, Biophys. J., vol. 63, 578 (1992)].

Thus, there has been great interest in the AFM community in the development of methods for extracting the nonlinear force-distance relationship with Dynamic AFM. Some methods have been developed which are based on analysis of the higher harmonics (or integer multiples) of the frequency of free cantilever oscillation [U.S. Pat. No. 6,935,167 (2005); R. W. Stark and W. M. Heckl, Rev. Sci. Instrum. vol. 74, 5111 (2003); M. Balantekin and A. Atalar, Appl. Phys. Lett. vol. 87, 243513 (2005); S. Crittenden, A. Raman and R. Reifenberger, Phys. Rev. B, vol. 72, 235422 (2005)] (by free cantilever oscillation, we mean oscillation in the absence of the tip-surface force) or harmonics of a torsional cantilever motion [U.S. Pat. No. 7,089,787, U.S. Pat. No. 7,302,833; O. Sahin et. al. Sens. Actuators A, vol. 114, 183 (2004); O. Sahin et al. Nat. Nanotechnology, vol. 2, 507 (2007)]. Because these harmonics do not coincide with bending eigenmodes of standard cantilevers, methods based on harmonics require special cantilevers in order to get appreciable response at the harmonic frequencies. Some of these cantilevers require a more complex readout system, and in any case, large measurement bandwidth is required to capture the harmonic progression. These problems limit the sensitivity of harmonic methods. Other Dynamic AFM methods which claim to extract additional tip-surface force information use two drives frequencies which excite the cantilever at two flexural eigenmodes, measuring response at these two frequencies [J. Lozano and R. Garcia, Phys. Rev. Lett. vol. 100, 076102 (2008); N. F. Martinez et. al, Appl. Phys. Lett. vol. 89, 153115 (2006), R. Proksch, Appl. Phys. Lett., vo. 189, 113121 (2006)]. These so-called Dual-AC techniques also require large measurement bandwidth, and have very limited information content, because they only collect response at two frequencies.

Here we describe a new method of Dynamic AFM which is based on the intermodulation of two or more drive frequencies. The use of Intermodulation in AFM was disclosed in a previous provisional patent application by us [USPTO Provisional pat. No. 60990518 (EFS ID 2515284, confirmation nr. 8137)]. Here we also describe additional methods of driving the cantilever which have advantages over those previously disclosed. We also describe methods of analysis of the spectrum of intermodulation products, which allow one to extract the force-distance curve. We call these methods of analysis Intermodulation Fingerprinting and Intermodulation Force Spectroscopy [USPTO Provisional pat. No. 61/096,370 confirmation nr. 4316].

SUMMARY OF THE INVENTION

We invented a method for sensing a surface, comprising the steps of oscillating a resonator with a sharp tip where the resonator is brought close to the surface to be sensed, characterized by the step of using a non-linear tip-surface interaction to generate intermodulation response of the resonator, and to measure the intermodulation products in the response, and thereby to obtain information about the surface. With this method, a plurality of intermodulation products can be measured near resonance, where sensitivity is highest. The intermodulation response thus generated contains much more information about the surface than is contained in the amplitude and phase response measured at one frequency as is the standard practice in dynamic scanning probe microscopy.

In one embodiment, the intermodulation measurement is performed when scanning over the surface. In this embodiment, our invention acts as a scanning probe microscope which can extract much more information about the surface than standard dynamic scanning probe microscopy does when scanning at the same speed and measuring with the same bandwidth.

In another embodiment, the intermodulation response is measured for both the approach and retraction of the resonator from the surface, revealing detailed information about surface through the intermodulation spectrum, which is highly sensitive to resonator-surface separation.

In one embodiment, the resonator is driven with two frequencies, $f_1$ and $f_2$, in the vicinity of the resonance, and the intermodulation products are of odd order ($f_{IM3}$, $f_{IM5}$, ...), and form a series of peaks in the response spectrum with spacing $n\Delta f = n(f_1 - f_2)$. In this embodiment the intermodulation response is especially sensitive to nonlinear tip-surface forces which are odd functions of the resonators displacement from equilibrium.

In another embodiment, a plurality of intermodulation products is generated near resonance where the response of the resonator is enhanced, and one drive frequency, $f_2$, is at or close to resonance frequency and one drive frequency, $f_1$, is close to half $f_2$, whereby only even order intermodulation products are produced near resonance. In this embodiment the intermodulation response is especially sensitive to nonlinear tip-surface forces which are even functions of the resonators displacement from equilibrium.

In yet another embodiment, a plurality of intermodulation products is generated near resonance where the response of the resonator is enhanced, and the resonator is driven with two frequencies, $f_1$ and $f_2$, where one drive frequency, $f_1$, is at a low frequency and one drive frequency $f_2$ is placed on or very near resonance, whereby an intermodulation product spectrum of both odd and even order is generated near resonance. In this embodiment the intermodulation response is sensitive to nonlinear tip-surface forces with components that are both odd and even functions of the resonators displacement from equilibrium. This is the preferred embodiment for finding an arbitrary tip-surface interaction.

In yet another embodiment, a plurality of intermodulation products is generated near resonance where the response of the resonator is enhanced, and both drive frequencies are outside the resonance curve. In this embodiment the resonator does not have large response at the drive frequencies, which effectively filters out the drive, and allows for larger detector gain without saturation of the detector signal.

In yet another embodiment a plurality of intermodulation products is generated near resonance, where the response of the resonator is enhanced, and more than two drive frequencies are used and all drive frequencies have a smallest common divisor. In this embodiment, the measured intermodulation products can be made especially sensitive to specific components of the nonlinear tip-surface interaction.

Any of the previous embodiments can comprise the steps of forming an image of the surface by plotting the amplitude of any individual intermodulation product which is recorded while scanning over the surface. An image thus formed is sensitive to changes in the chemical and physics properties of different components of the surface. Furthermore, the information, encoded in the entire intermodulation spectrum recorded at each point on the surface, can be combined to improve the contrast between areas of different composition and thus the accuracy in distinguishing different compounds on the surface. At each point on the surface, the intermodulation spectrum contains many intermodulation products, which are complex values having both amplitude and phase, and which contain far more information than the single amplitude and phase values recorded in standard dynamic AFM. With the extra information available in intermodulation spectra, it is possible to extract the nonlinear force distance curve for the tip-surface interaction while scanning in dynamic mode AFM.

We invented a controller for an intermodulation atomic force microscope performing the methods of any of the previous embodiments, comprising a digital signal synthesis (DSS) module and a digital signal processing (DSP) module, whose functions can be realized with a field programmable gate array (FPGA) circuit, such that the clocks of the DSS and DSP modules are synchronized to ensure that the waveform generation and sampling of the response is performed with exact integer multiples of the smallest common devisor of all drive frequencies. Synthesis of drive signals and sampling of resonator response in this way allows for efficient signal processing to determine the intermodulation spectrum in real time, while scanning, by the highly parallel FPGA circuit.

In any of the previous embodiments, the measured intermodulation response of the resonator can be used to find the expansion coefficients of the force or potential, or functions thereof, around a given distance, which allows to find relevant surface properties by making use of these expansion coefficients to approximately find the tip-surface force or tip-surface potential, or functions thereof, either by making use of the named expansion coefficients, or by assuming a functional form for the tip-surface potential and using the intermodulation products to determine parameters in the assumed functional form, or by making use of the observed time-resolved motion of the resonator, deriving in addition to the distance-time information also a force-time information in order to find a force-distance curve.

We invented a computer program or algorithm implementing the methods of our invention, which performs spectral analysis of the frequency spectrum of the intermodulation response using a combination of all intermodulation products that can be measured above the noise level when performing the intermodulation scanning probe technique. One function of the computer program product is to store the amplitude and phase values of the measured intermodulation products generated at each point on the surface while scanning over the surface. Another function of the computer program is to process the above mentioned amplitude and phase values at each point on the surface to improve the contrast between areas of different composition and thus the accuracy of distinguishing different components on the surface. Yet another function of the computer program is to analyze the intermodulation spectrum at each point on the surface in order to extract the expansion coefficients of the nonlinear force distance curve for the tip-surface interaction at that point on the surface. Yet another function of the computer program is to plot the resulting stored, processed, or analyzed data to form an image of the surface.

In one embodiment the computer program iteratively improves the accuracy of approximation of the expansion coefficients by using the approximately calculated values of the expansion coefficients in order to approximately calculate those intermodulation products, which are experimentally not easily accessible or so only with huge noise.

DETAILED DESCRIPTION

We claim the invention of a new mode of Scanning Probe Microscopy (SPM) which exploits a non-linear phenomenon called intermodulation to sense a surface, and which is hereafter called Intermodulation Scanning Probe Microscopy (IMSPM). In IMSPM, a linear oscillator (oscillating cantilever or other resonant sensor, hereafter called resonator) is driven with two oscillation frequencies in the vicinity of the resonance. Intermodulation products are generated when a sharp tip attached to the resonator is brought close to a surface, and the linearity of the resonator is perturbed by the non-linear tip-surface interaction potential. These intermodulation products are very sensitive to the appearance of a weak non-linear interaction and thus their measurement increases the sensitivity of SPM. Furthermore, IMSPM is a very powerful technique when scanning over the surface or when taking force-distance curves (sweeping tip-surface separation and recording resonator response). By measuring many intermodulation products of higher order, much more information can be obtained in a single scan or force-distance sweep, than is otherwise possible to obtain with the standard resonant detection techniques currently in practice today.

Figure 1A:
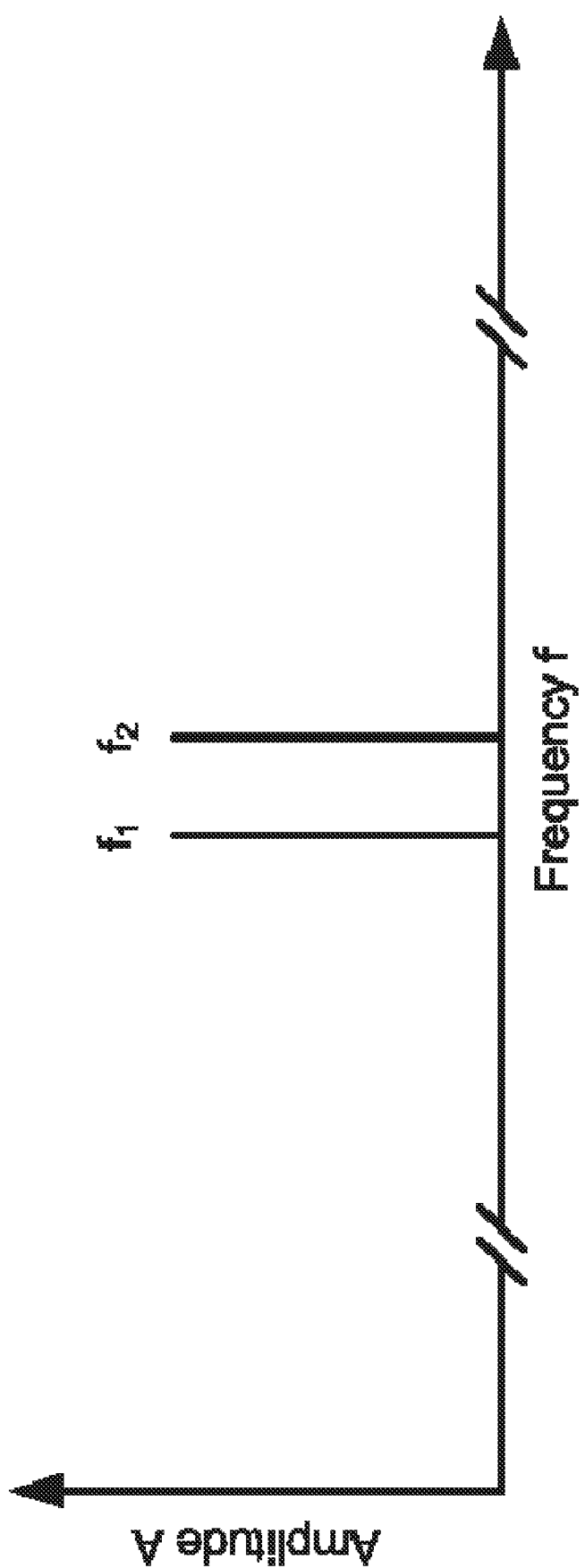
FIG. 1 A) The linear response of the resonator away from the surface. When driven with two frequencies, $f_1$ and $f_2$, the linear system responds with oscillation at $f_1$ and $f_2$. B) When close to the surface, a non-linear tip-surface interaction introduces intermodulation products of many orders. C) By placing the drive $f_1$ at low frequency, many IMPs of both even and odd order can be generated close to resonance.
Figure 1B:
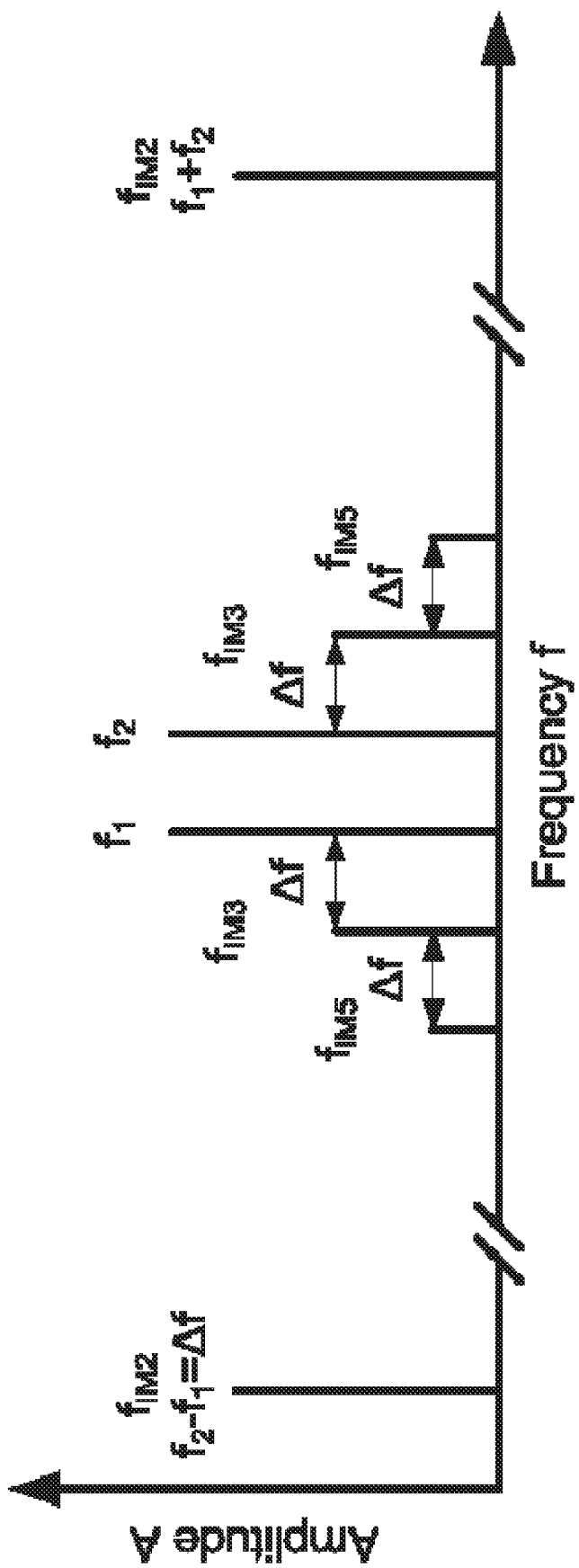

While linear response of the resonator is desirable, the interaction potential between the tip and the surface is in general an interaction which is non-linear in the coordinate describing the extension of the resonator. This non-linear interaction perturbs the linearity of the resonator. The invention described here exploits the non-linear nature of this perturbation to realize a new and very sensitive mode of SPM which we call Intermodulation SPM (IMSPM). The new idea is to sense this non-linear interaction by means of intermodulation measurement. Intermodulation is a phenomenon in driven non-linear systems, whereby the presence of a non-linearity causes the generation of new frequencies in the response which are not present in the drive. In many engineering contexts intermodulation is considered an undesirable distortion, and intermodulation measurements are used as a way to characterize this distortion [Intermodulation Distortion in Microwave and Wireless Circuits, by J. C. Pedro and N. B. Carvalho, ISBN 1-58053-356-6]. In FIG. 1 we can compare the response of a linear system (FIG. 1A) and a non-linear system (FIG. 1B) when driven with two frequencies. The linear system shows response only at the two drive frequencies, $f_1$ and $f_2$. However, in the non-linear system, new frequencies are present in the response and these are the intermodulation products. Following the usual convention, we denote these intermodulation products by their order. Of particular interest for the invention described here are the odd order intermodulation products which form a series of peaks in the response spectrum, with spacing $n\Delta f = n(f_2 - f_1)$ from the two drive frequencies (n an integer). When $f_1$ and $f_2$ are near a resonance frequency of the resonator, and $\Delta f$ is of order of the linewidth of the resonator or smaller, a large number of such intermodulation products will be visible in the response of the resonator when it is brought close to the surface.

Intermodulation is a phenomenon of nonlinear dynamical systems when driven with two or more pure harmonic tones. We will consider two drives at the discrete frequencies $f_1$ and $f_2$, however schemes with more drives, $f_3, f_4, \ldots$ are also easily realizable. The presence of a relatively weak nonlinearity will cause response of the system at frequencies other than the drive frequencies, at the so-called intermodulation products (IMPs), which give response at the following frequencies (for two frequencies):

$$f_{IMl} = mf_1 + nf_2 \text{ where } l = |m| + |n|, m \text{ and } n \text{ are integers.}$$

For more than two drive frequencies, the intermodulation products create response at:

$$f_{IMl} = n_1 f_1 + n_2 f_2 + n_3 f_3 + \ldots \text{ where } l = |n_1| + |n_2| + |n_2| + \ldots, n_1, n_2, n_3 \ldots \text{ are integers.}$$

Figure 1C:
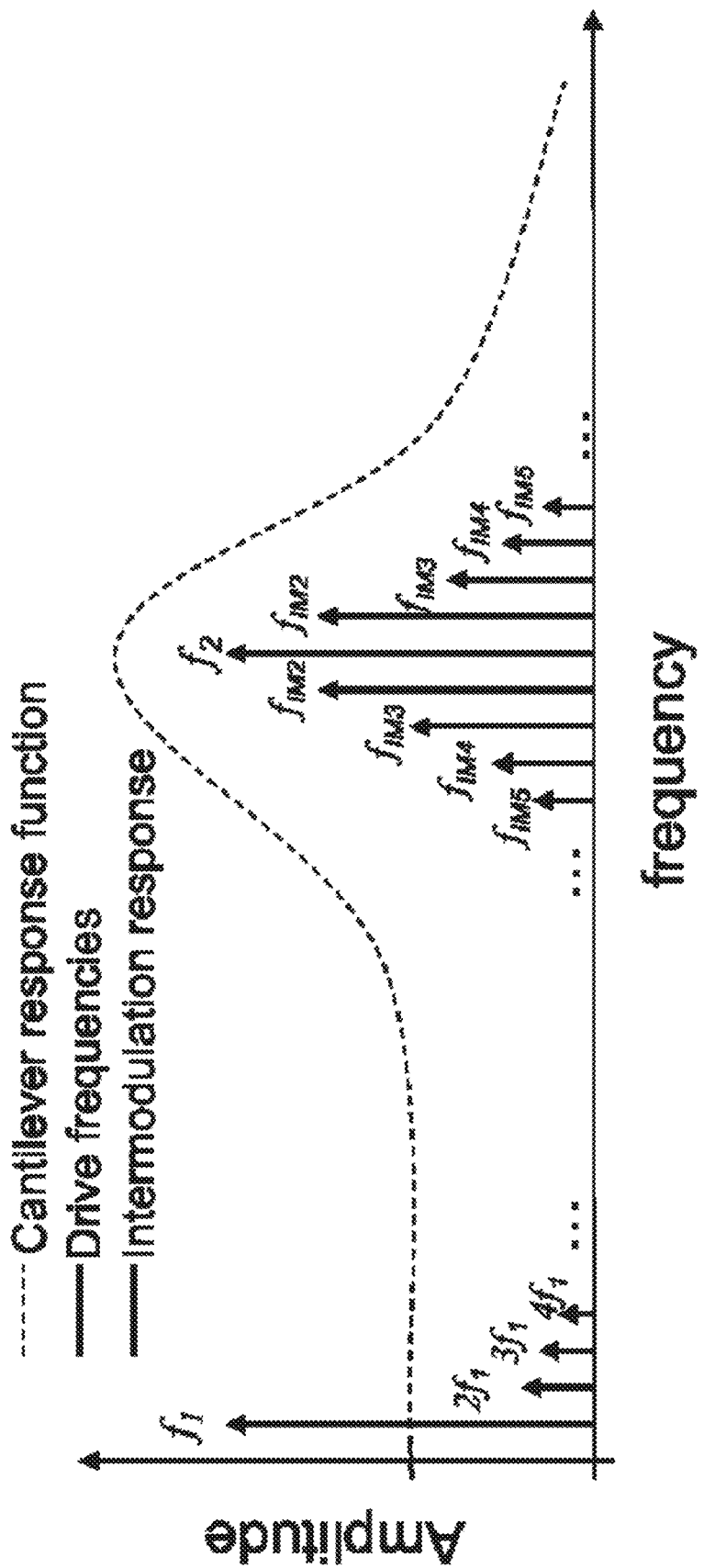

The integer l gives the order of the IMP. We note that more than one peak in the spectrum can have the same order, and for more than two drives a peak can have contributions from more than one order and is thus better referred to by its frequency. By proper choice of the drive tones we can generate many IMPs in the frequency region where the cantilever has large response, around a resonance. In our previous provisional patent [USPTO Provisional pat. No. 60990518 (EFS ID 2515284, confirmation nr. 8137)] we chose $f_1$ and $f_2$ both inside the resonance, spaced by $\Delta f$. This produces a spectrum of IMP response with odd order IMPs near resonance (l an odd integer). In FIG. 1C, we show an alternative method, where $f_1$ is chosen at a low frequency, and $f_2$ is placed on or very near resonance such that $f_2 = mf_1$ where m is an integer. In this case, we generate an IMP spectrum of both odd and even order IMPs near resonance. Other choices of $f_1$ and $f_2$ can be made, and the optimal choice will depend on the type of nonlinear force-distance function that one is trying to measure. The objective is to generate the desired IMP spectrum near resonance, where the response of the cantilever is greatly enhanced.

Figure 2:
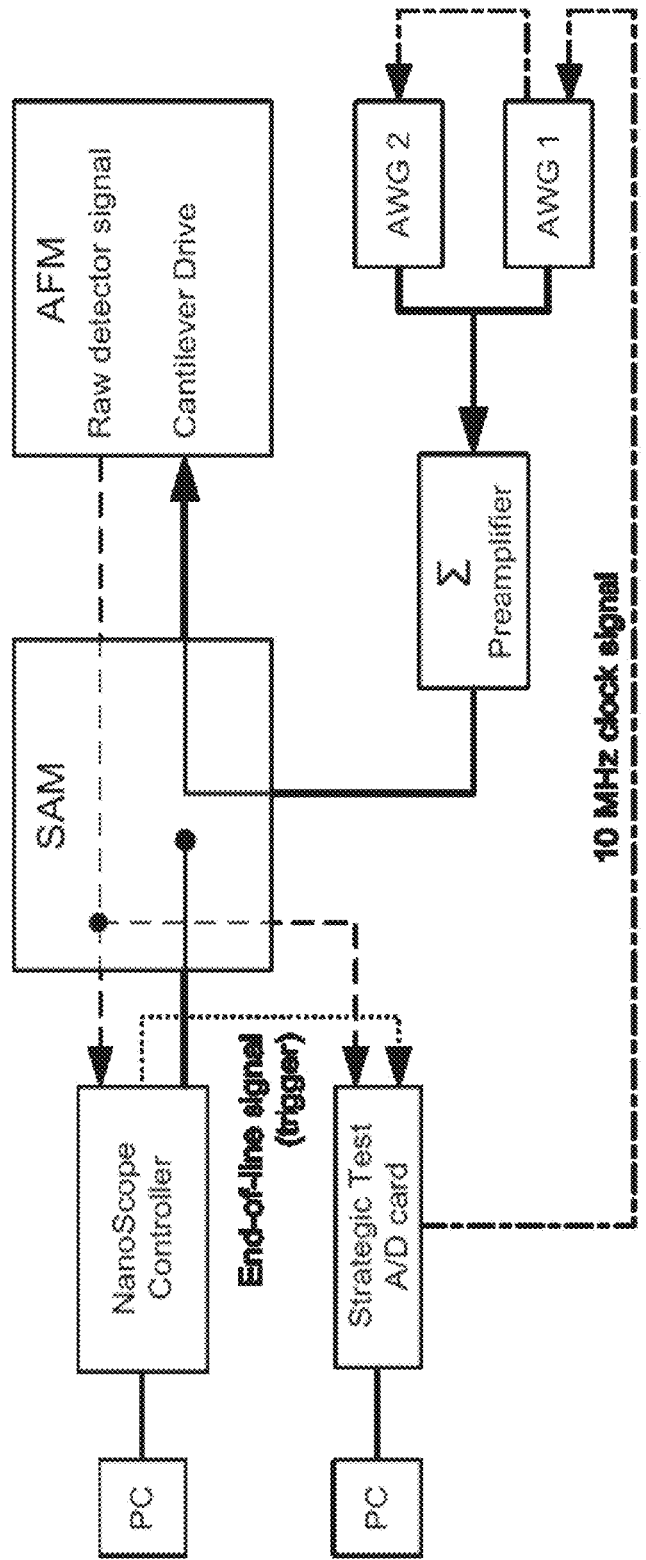
FIG. 2 A schematic of our set-up used to demonstrate the method of IMAFM.

We describe a demonstration of IMSPM in the form of Intermodulation Atomic Force Microscopy (IMAFM). FIG. 2 shows a schematic of the particular implementation we used. The Veeco Multi Mode AFM and Nanoscope IV controller equipped with a Veeco Single Access Module (SAM) together with several pieces of auxiliary equipment was used. The signal used to drive the cantilever consisting of two frequencies, was synthesized with two arbitrary waveform generators (AWGs) and a summing preamplifier. A strategic test Analog to Digital (A/D) data acquisition card was used to capture the cantilever response signal from the raw detector signal of the split quadrant photodiode in the multimode AFM head. A separate Personal Computer (PC) was used to Fourier transform the response and extract the intermodulation products. When scanning the test samples, our IMAFM system was run in parallel with the Nanoscope controller system, using the feedback and scanning controls of the Nanoscope controller. In this way we could compare the standard amplitude and phase imaging methods with our new IMAFM method. The implementation of IMAFM described here can be simplified considerably and integrated in to one AFM system if, for example, the two frequencies of the drive are generated directly by digital waveform synthesis, without the summing amplifier, and if digital signal processing in one computer systems is used to analyze the raw data coming from the detector signal.

The AFM probe used here was a Si tapping mode probe with a beam cantilever and tip, having a resonant frequency of about 330 kHz. The probe was mounted in the Veeco multimode head, which uses an optical lever to measure the cantilever response. The test surface was a flame annealed Au surface on an oxidized Si chip. The sample and tip were cleaned in oxygen plasma prior to experiment. The experiments were performed under ambient conditions in air.

Figure 3:
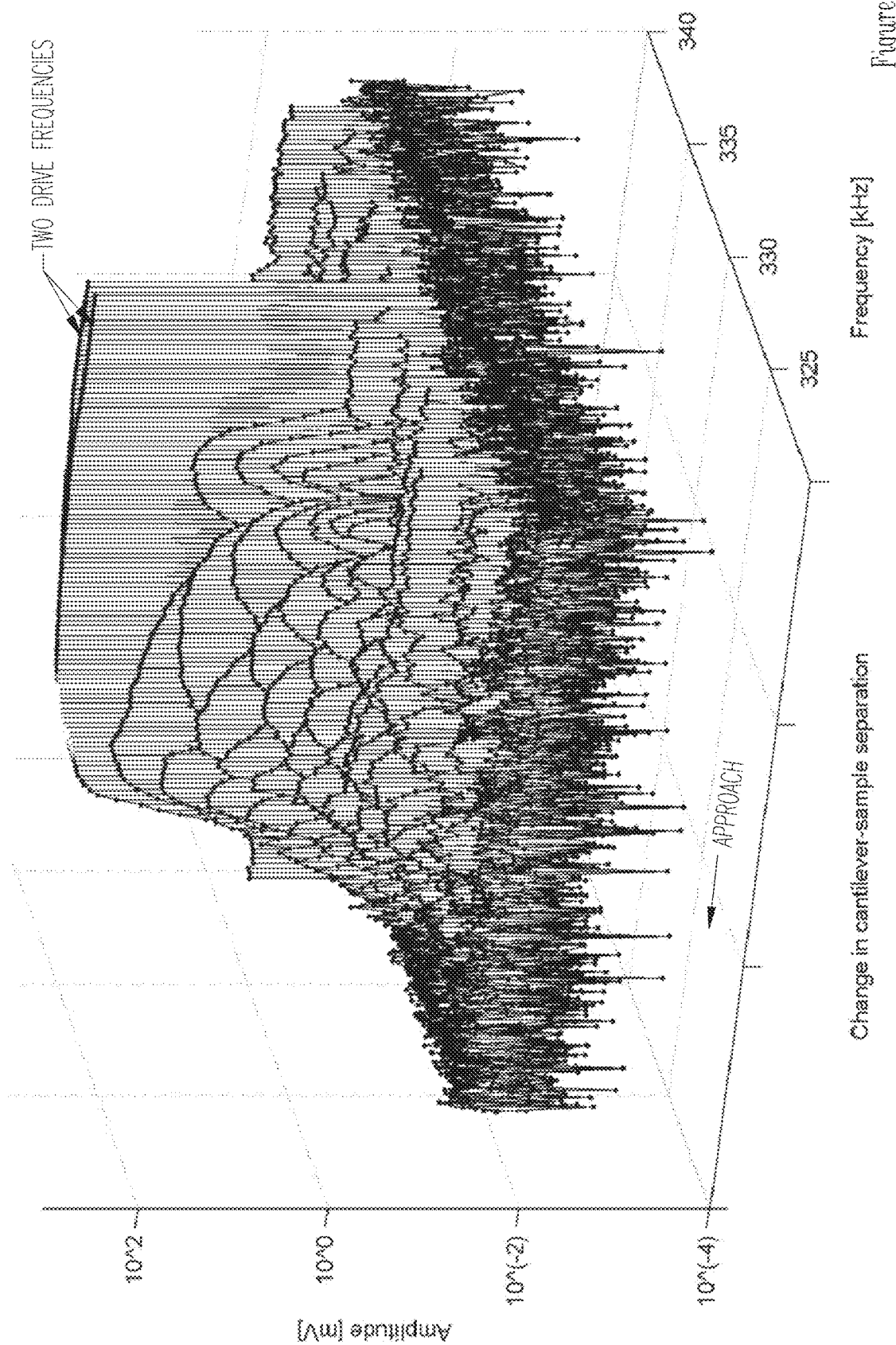
FIG. 3 The frequency spectra of the cantilever response is plotted as the surface is approached. Many intermodulation peaks of higher order can be seen where the amplitude of each peak is strongly dependant on the tip-surface separation.

FIG. 3 shows a three-dimensional plot where the frequency spectrum of the cantilever response is plotted as the cantilever is approaching the sample. Plotted on the vertical, Z-axis, is the cantilever response amplitude with a log scale. When the tip is far from the surface, at the right hand side of FIG. 3, we see that the response spectrum has two dominant peaks corresponding to the drive frequencies. At this distance from the surface the cantilever is undergoing free oscillation, unperturbed by the tip-surface interaction. Apart from the response at the two drive frequencies, we also see a background of intermodulation peaks of many orders. This background is due to very weak non-linearities in the electronic amplifiers used in the drive circuitry and the data acquisition card. This background can be eliminated with better quality electronics.

We have determined that this background of intermodulation products at the drive amplitudes used, are not due to non-linear cantilever dynamics.

As the surface is approached (moving from the right to left in FIG. 3) the spectra show a large increase in the measured intermodulation products, and the measured amplitude of these intermodulation products show much structure and variation. This structure and variation of the intermodulation products is due to the introduction of the non-linear tip-surface potential, which changes the character of the resonator as it is brought closer to the surface. From analysis of this rich structure and variation of the intermodulation products and its dependence on tip-surface separation, much information can be obtained about the nature of the non-linear tip-surface interaction.

Figure 4B:
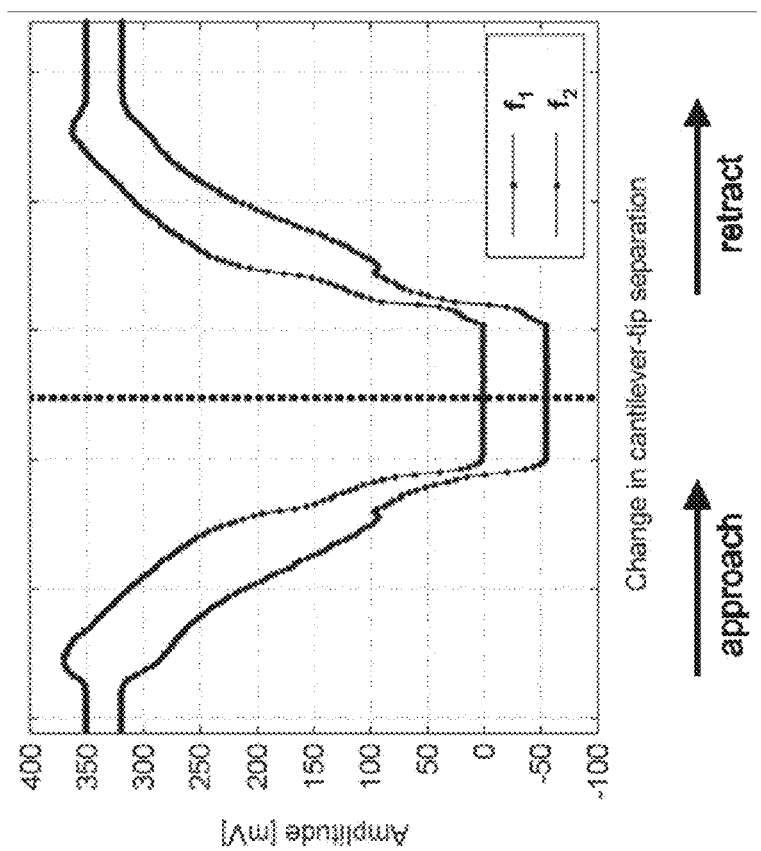
FIG. 4 A) The first three odd order intermodulation products are plotted as the resonator approaches and is retracted from the surface. The curves for IM5 and IM7 are offset by −30 mV and −60 mV respectively, for clarity. B) The amplitude of response at the two drive frequencies. The curve for $f_2$ is offset by −50 mV for clarity.
Figure 4A:
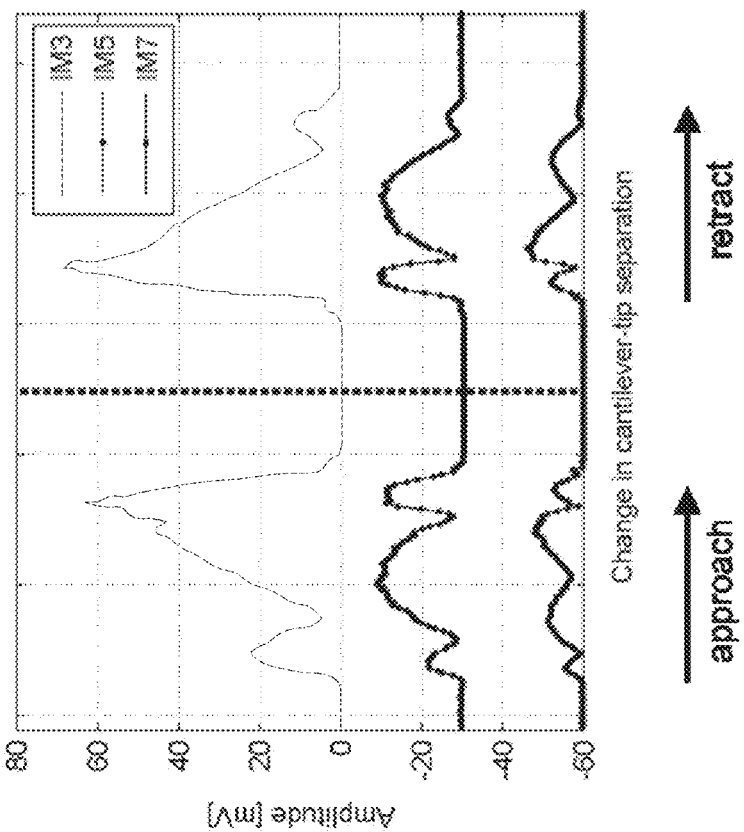

In FIG. 4 we show a two-dimensional plot, with a linear vertical scale, of the cantilever amplitude at the two drive frequencies, $f_1$ and $f_2$ (FIG. 4B), and the first three odd intermodulation products, IM3, IM5 and IM7 (FIG. 4A). Here we see the response both for the approach and for retracting of the tip from the surface, which is done in one continuous sweep to and from the surface. The strong similarity of the approach and retract for each curve demonstrates that the measured change in cantilever response is reversible. In FIG. 4A all three intermodulation (IM) response curves start from a very low level of response when the cantilever is free from the surface (nearly zero on this linear scale, IM5 and IM7 curves have been offset on the vertical access for clarity). The sweep brings the tip completely in constant contact with the surface so that the resonator response goes again to zero at closest approach.

In contrast, the response at the two drive frequencies in FIG. 4B starts from the high level of free oscillation of the cantilever. This difference in response level of the IM products compared with the response of the two drive frequencies can be used to further enhance the sensitivity of the AFM. By filtering out the response at the drive frequencies, we can use higher gain in the detection system when measuring the IM products while avoiding the saturation effects that will arise when measuring the large amplitude response at the drive frequencies.

Figure 5:
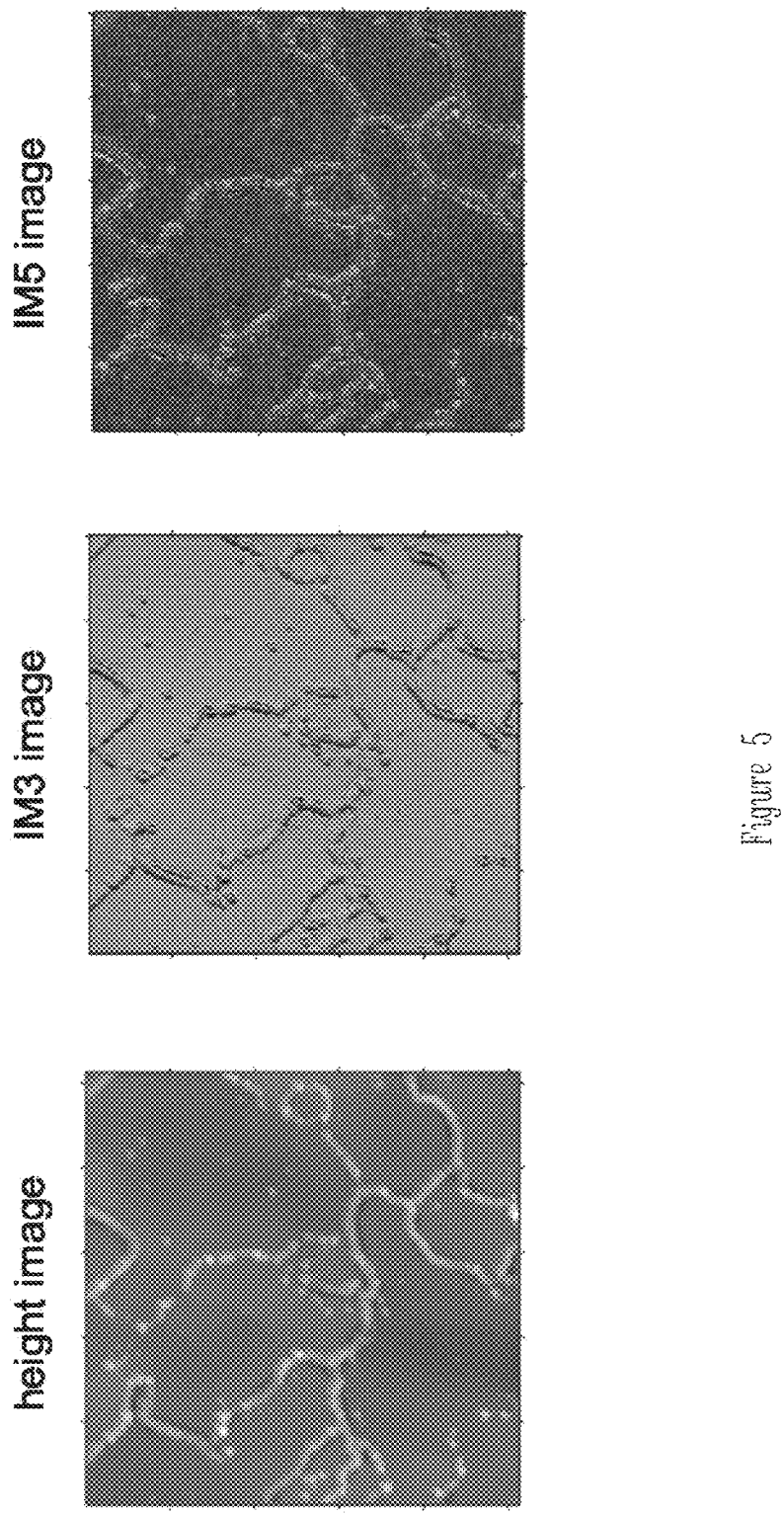
FIG. 5 The height image (feedback signal image) was recorded in standard tapping mode AFM. Simultaneously the IM3 and IM5 image were recorded. The scan size was 5 um×5 um. The sample is flame annealed Au, where impurities are seen to collect at hills between flat crystalline grains.

We have also demonstrated the use of IMAFM in imaging mode. The Veeco system was configured for a standard tapping mode height image, where feedback regulated the tip-surface separation to keep constant amplitude of the cantilever response at one of the drive frequencies, as the tip was scanned over the surface. While scanning, the height image (i.e. feedback signal) was recorded and simultaneously our computer system was gathering several images by recording the amplitude of IM products of higher orders. FIG. 5 shows a comparison of the height image with the IM3 and IM5 images.

Figure 6:
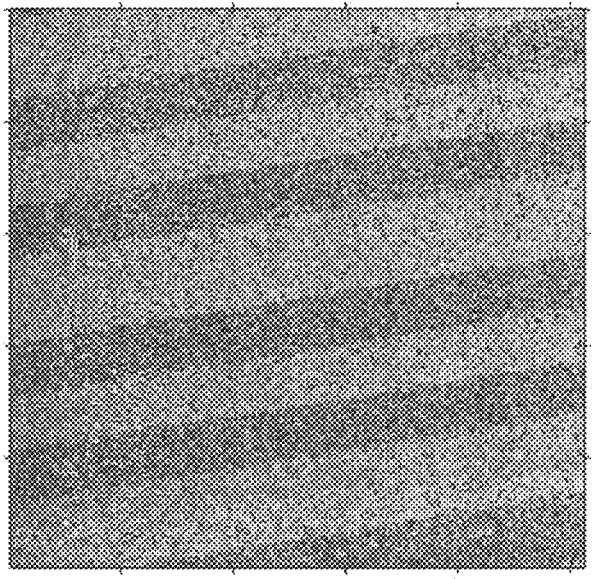
FIG. 6 A comparison of the phase image of standard tapping mode AFM and the IM3 image collected simultaneously. The sample is a protein monolayer adsorbed on to smooth SiOx surface. A striped pattern exposed with an electron beam causes a chemical change in the surface, but no change in surface topography.
Figure 6:
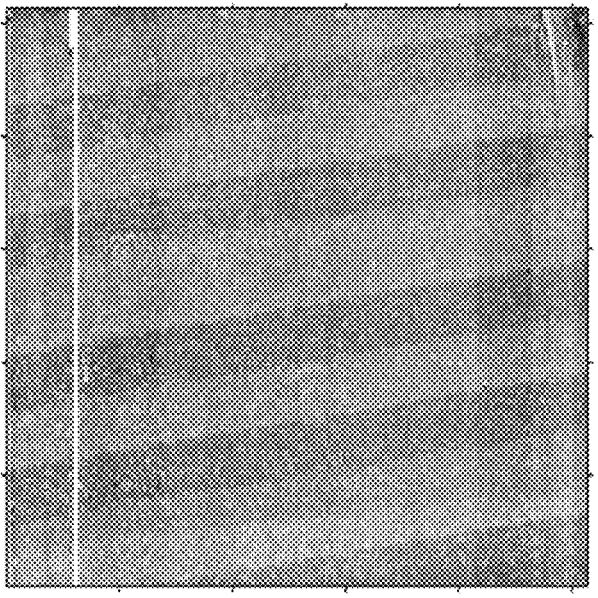

To further demonstrate the sensitivity of IMAFM in imaging mode, we imaged a special sample consisting of a protein monolayer adsorbed on to a smooth Si surface. On this surface a stripe pattern is exposed with a low energy electron beam in an electron beam lithography system. The exposure causes a chemical change in the surface where the electrons strike the protein monolayer, but the exposure does not cause a change in topography of the surface [D. Pesen et. al. Lab Chip, vol. 7, 1603 (2007)]. Consequently, no image of the exposed striped pattern is visible in the standard height image of tapping mode AFM. However, as demonstrated in FIG. 6, the exposed striped pattern can be seen in the phase image of tapping mode AFM, and in our new intermodulation imagining mode. This experiment demonstrates that IM imaging mode is sensitive to the small subtle changes in interaction between the tip and surface, even when no change of topography is present.

We hereby disclose a method of operating an Atomic Force Microscope (AFM) and analyzing the measured data, which allows one to discriminate different compounds and extract the nonlinear force-distance curve for the tip-sample interaction while scanning in dynamic mode AFM. Our method is based on driving the cantilever with two or more frequencies so as to induce Intermodulation Products (IMPs) of the drives which are the result of the nonlinear tip-surface force. With proper choice of the drive frequencies, IMPs will appear in the frequency band corresponding to the mechanical resonance of the cantilever, so that the enhanced sensitivity of Dynamic AFM is preserved. Our measurement and analysis methods, which use only one eigenmode of the cantilever, do not rely on harmonics of the cantilever resonance.

The methods for analysis disclosed in a later section are applicable to drive frequencies as shown in FIG. 1 as well as to other strategies for choosing the drive frequencies. These other strategies include having one drive frequency at or close to resonance frequency and one drive frequency close to half the drive frequency, which will produce only even order IMPs near resonance. Yet another strategy is to have both drive frequencies outside the resonance curve, which can further reduce the noise level. These other strategies further include more than two drive frequencies, which can be employed in order to improve the sensitivity on specific components of the nonlinearity. In the case of more than two drive frequencies we require the drive frequencies to have a finite-valued smallest common divisor, which will be important for the analysis methods. This requirement, that all drives are integer multiples of this smallest common divisor, excludes a continuous frequency range drive, as used in band excitation techniques [S. Jesse et al., Nanotechnology, vol. 18, 435503 (2007)].

Figure 7:
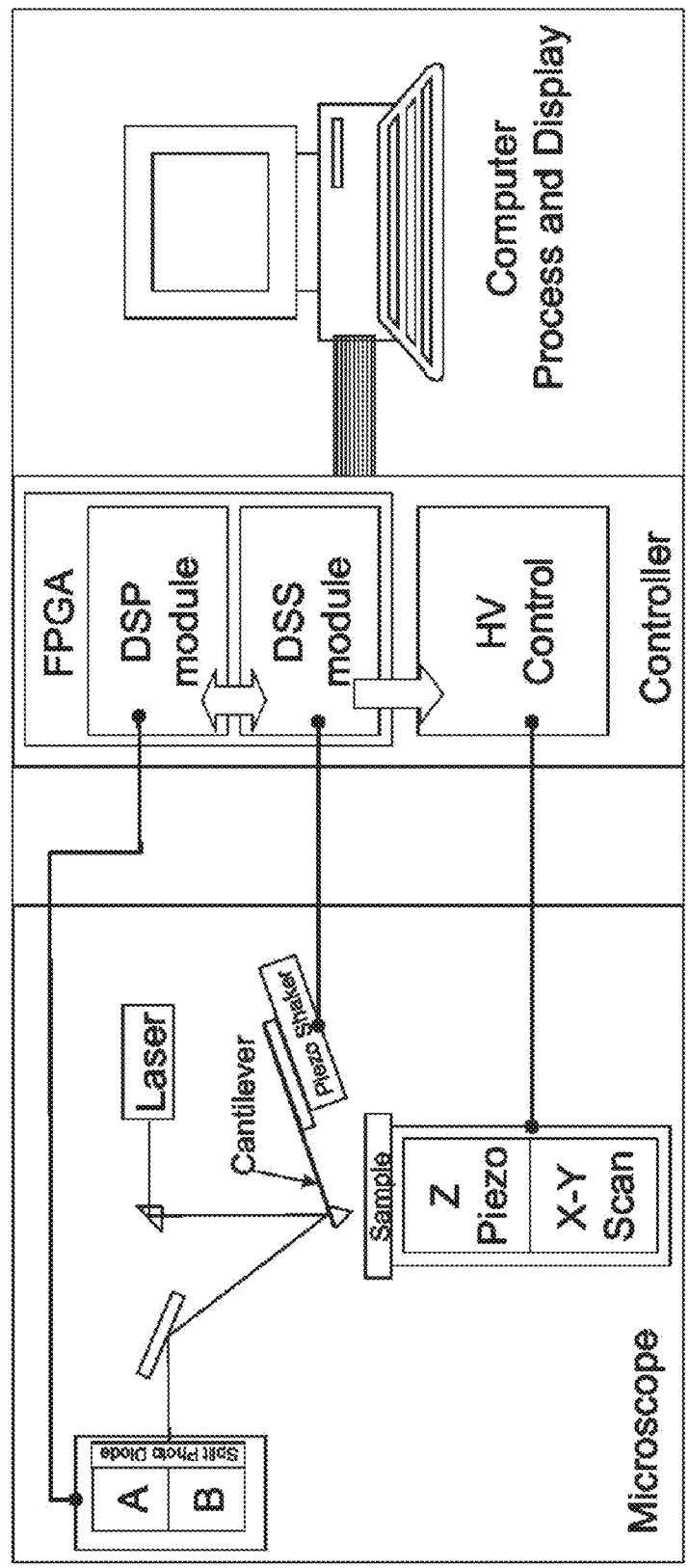
FIG. 7 A block diagram of the architecture of an Intermodulation Atomic Force Microscope capable of performing Intermodulation Force Spectroscopy.

Intermodulation Force Spectroscopy can be implemented on many existing AFM systems with additional hardware and/or software. In all cases, special software is required for analysis of the intermodulation spectra with algorithms described below. The typical architecture of an Intermodulation Atomic Force Microscope is shown as a block diagram in FIG. 7. The controller consists of three main blocks, a digital signal processing (DSP) module, a digital signal synthesis (DSS) module, and a high voltage module to drive the Piezo in the scanner. The DSP module performs signal analysis of the cantilever response which is measured by a split photo diode sensor in the optical lever, typical to most AFM's sold today. The DSS module synthesizes the drive frequencies, which are applied to the cantilever via a piezo shaker, mounted in the cantilever holder. It is also possible, and in some cases advantageous, to apply one or more of the drives (for example the low frequency drive f. of FIG. 1C) not to the piezo shaker, but rather to the Z piezo in the scanner, via the high voltage control circuit. The clocks of the DSP and DSS modules are synchronized to insure that the waveform generation and sampling of the response is performed with exact integer multiples of the smallest common devisor mentioned above. The functions of the DSP and DSS modules can be realized with a Field Programmable Gate Array (FPGA) circuit. The computer captures the intermodulation spectra from the controller, performs further analysis, controls the scanning process as well as the image capture, display and storage.

Analysis of Intermodulation Spectra:

The oscillating cantilever in the presence of a surface is a nonlinear dynamical system. When driven with two or more pure tones, it will generate response at IMPs which can be captured and analyzed. The amplitude and phase of the response at the IMPs depends on the exact form of the nonlinearity, and the IMP spectra acquired at each image point thus contain much information about the chemical and physical properties of the surface at a specific location. It is, however, not obvious how the information encoded in the IMPs is related to such chemical or physical properties. In a previous provisional patent application by some of us [USPTO Provisional pat. No. 60990518 (EFS ID 2515284, confirmation nr. 8137)] it was shown that the amplitudes of a single intermodulation product can be used to distinguish two different compounds even if the surface is flat, i.e., the compounds show no difference in a standard tapping mode amplitude image. This previous provisional patent did not discuss how to use the combined information measured in the entire intermodulation spectrum. In the following we disclose new spectral analysis methods which use a combination of all IMPs that can be measured above the noise level when performing the intermodulation scanning probe technique. The combined analysis of the intermodulation products is hereafter called Intermodulation Fingerprinting (in the context of discriminating different materials or compounds) or Intermodulation Force Spectroscopy (in the context of finding the tip-surface force).

1) Discriminating Different Materials or Compounds:

We now describe how to improve the contrast between areas of different composition, and thus the accuracy in distinguishing them, by making use of many IMPs.

First consider the simplest possible question: How can we use a single IMP to decide whether or not the composition of the surface at two points, 1 and 2, is the same? Denoting the IMPs for the two points by $x_1$ and $x_2$ respectively, it is most natural to consider the difference $|x_1-x_2|$ and conclude that the material at point 1 differs from that of point 2 if $|x_1-x_2|>\delta$, where $\delta$ is a threshold parameter depending on the experimental resolution. On the other hand, if $|x_1-x_2|<\delta$, this does not automatically mean that the compounds are the same: It could happen by chance that different materials show the same or a very similar amplitude for one of the IMPs. This is a problem known in AFM phase imaging, where different materials can by chance show a very similar lag between the drive and response. If we have measured several IMPs, it is, however, quite unlikely that all of them would agree if the surface had different composition at the two points. Thus, we expect to be able to increase the discrimination power by simultaneously using several measured IMPs. We now formalize this problem, and describe a general strategy for finding Intermodulation Fingerprinting Algorithms (IFAs) that can achieve optimal discrimination, not only between two points but between various patches on a surface.

Experiments can measure not only the amplitude, but also the phase (relative to that of the drive) of the IMPs. These two parts of information for each IMP are equivalent to, and easily transformable into, a single complex-valued number, z, for each IMP. Thus an experiment which measures N IMPs, but is sensitive only to amplitudes, will give as output a point $x=(x^{(1)}, x^{(2)}, \ldots x^{(N)})$ in the N dimensional space $R^N$, while a phase sensitive experiment will give a point z in the 2N dimensional space $C^N$. In the following we shall consider the amplitude-only case, but the generalization to phase sensitive experiments should be obvious, and clearly the discrimination power is generally improved when one gains both amplitude and phase information in the experiment.

A natural approach to discriminating between two points, $x_1$ and $x_2$, is to find a positive definite distance function, $d(x_1, x_2)$, on the relevant space. Such functions are well studied in the mathematics literature and satisfy the triangle property $d(x_1, x_3) \leq d(x_1, x_2) + d(x_2, x_3)$ which means that the distance going straight from point 1 to 3 is not longer than if one takes the route via 2. There are many possible distance functions, as for instance the "Manhattan distance" $d(x_1-x_2)_M = |x_1^{(1)}-x_2^{(1)}| + |x_1^{(2)}-x_2^{(2)}| + \ldots |x_1^{(N)}-x_2^{(N)}|$, or the Eucledian distance $d(x_1-x_2)_E^2 = (x_1^{(1)}-x_2^{(1)})^2 + (x_1^{(2)}-x_2^{(2)})^2 + \ldots (x_1^{(N)}-x_2^{(N)})^2$. Both these choices treat all entries in x on the same footing, but in reality we expect correlations in the IMPs so it might not be optimal to give all distances the same weight. An important class of distance functions, based on the so called p-norm is given by, $$d(x_1-x_2)^p = \lambda_1 |x_1^{(1)}-x_2^{(1)}|^p + \lambda_2 |x_1^{(2)}-x_2^{(2)}|^p + \ldots \lambda_N |x_1^{(N)}-x_2^{(N)}|^p$$

where p>1 and $\lambda = (\lambda_1, \lambda_2 \ldots \lambda_N)$ are N+1 real positive parameters. Putting all the $\lambda_i$s equal and taking p=1 and p=2 correspond to the two examples given above.

There is no a priori way to find the parameters p and $\lambda$, so we propose a strategy for how to determine optimal choices for them from experiments. Consider a situation where we want to discriminate between two different surface materials, A and B. We first carefully prepare very clean samples of the two materials and use these to produce two sets of IMPs: $\{x_i\}_A$ and $\{x_i\}_B$. Even though the surface material is the same the entries in the two sets will vary, both because of the actual topography of the surface, and because of noise in the experiment. We are now left with an optimization problem: Determine the distance function parameters p and $\lambda$, and a threshold parameter, $\delta$, so that the test: $d(x_1-x_2)^p > \delta$ is optimal for discriminating between classes A and B. What is the optimal condition can vary depending on whether one is most interested in being very sure that the composition differs at the two points, or rather to be confident that it really is the same.

There are several approaches to the actual optimization procedure. In the simplest case of only two types of material and low N, corresponding to just a few IMPs, one should be able to use standard least-square algorithms. In the future, data samples describing many different compounds and with more IMPs will most likely require more sophisticated algorithms.

Having found a good distance function, one now scans the unknown sample, S, and collects a data set $\{x_i\}_S$ taken at a large number of grid points, where the cell size of the grid should be smaller than the smallest patch of material that one wants to resolve. A direct way to represent the data is now to calculate the average distance from each grid point to a representative subset of points taken from samples such as $\{x_i\}_A$ and $\{x_i\}_B$ which have known composition.

These distances $A_i$, $B_i$ etc will provide an IMP fingerprint, that is, a pattern which is unique to the tip-surface interaction at that point. Using color coding, one can then produce a map where the different regions are distinguished by color. Such an IMP fingerprint map will provide a direct, visual representation of the surface composition.

In an alternative approach we can for each grid point, r, define a contrast function $$C(r) = \sum_s d(x_s, x_r) f(r-s),$$

where f is a weight function that peaks around 0, s is another point of the grid, and the sum runs over all such other points in the grid. By plotting the contrast function one will get a direct visual representation of the borderlines between different regions, which might be more sensitive to patch boundaries than the simple IMP fingerprint.

We also envision a more general approach, based on pattern recognition, which is not limited to the use of distance functions. Here one would directly look for patterns in the data sets $\{x_i\}_S$. Using many control samples $S_a$, which are prepared to have a known pattern of patches, one would train an artificial neural network to recognize these pattern. The neural network could then be used to predict the pattern for the real samples.

2) Finding Expansion Coefficients and the Tip-Surface Potential:

Now we turn to show how one can find the tip-surface force or potential from the measured intermodulation spectrum. Clearly, if the tip-surface potential is given at two x-y points, this information is also sufficient for deciding whether the material at these two points is the same. Since the tip-surface potential is closely related to physical and chemical properties, this information is however even more valuable than only answering whether the material at two points is the same.

While the techniques disclosed in the previous section can be applied to any IMPs achieved in scanning probe techniques, we will now restrict ourselves to specific driving and operation conditions: We choose the two (or more) drive frequencies to be commensurate with one another so that the drive has a well defined period. In other words, the drive frequencies $f_1$, $f_2$ (and possibly $f_3$, $f_4 \ldots$ ) shall have a (finite) smallest common divisor $\Delta f = cd(f_1, f_2, \ldots )$. This can be achieved by tuning the drive frequencies such that they are rational fractions of each other, e.g., for two drive frequencies by choosing $f_2$ such that $f_2 = f_1 * n/m$, where n and m are integers. Furthermore, the sampling frequency, $\delta f$, used to acquire the data from the detector, shall be an integer multiple of the frequency $\Delta f$, i.e., $\delta f = l \Delta f$, with l an integer (typically a large integer multiple of 2, for efficient Fast Fourier Transform). The conditions described in this paragraph can be achieved, when the waveform synthesizer for the drives and the analog to digital converters sampling the response are all locked to the same clock signal.

If the drive strengths, and the coupling between the surface and the cantilever, are small enough, the response will to a good approximation be a periodic function, with the same period as the frequency $\Delta f$. In an experimentally acquired frequency spectrum, one will then observe peaks at frequencies which are multiples of $\Delta f$. We can thus label these frequencies, $k*\Delta f$, by the integer numbers k. We further denote the complex-valued signal at frequency $k*\Delta f$ (in suitable dimensionless units) by $z_k$. The output at frequency $k*\Delta f$ can then be expressed as $$z_k = z_k^{drive} G_k \sum_j H_{kj} \cdot g_j \quad (*)$$

Here, $z_k^{drive}$ is the part of the output which is solely due to the drive, and which is present even when no interaction between the cantilever and the surface is present ($z_k^{drive}$ will be zero at frequencies which are not drive frequencies). The value of $z_k^{drive}$ can thus be measured experimentally by positioning the cantilever sufficiently far away from the surface, where the second term on the right hand side of (*) will vanish. This term can be written as the product of the Greens- or transfer function $G_k$ (which is easily measurable and approximately calculable) at frequency $k*\Delta f$ with the nonlinear tip-surface force in dimensionless units. The latter can be expressed as a sum over expansion coefficients $g_j$ (which are the coefficients in a Taylor series expansion of the dimensionless force curve around the equilibrium point of the cantilever) multiplied with matrix elements $K_{kj}$ which we will specify later. The general strategy is to solve equation (*) for $g_j$, i.e., to find with the help of the measured intermodulation products and the corresponding information $z_k$ the expansion coefficients of the force curve $g_j$. One can then use these expansion coefficients to find an (approximate) force curve around the expansion point. This strategy is visualized in FIG. 8.

Figure 8:
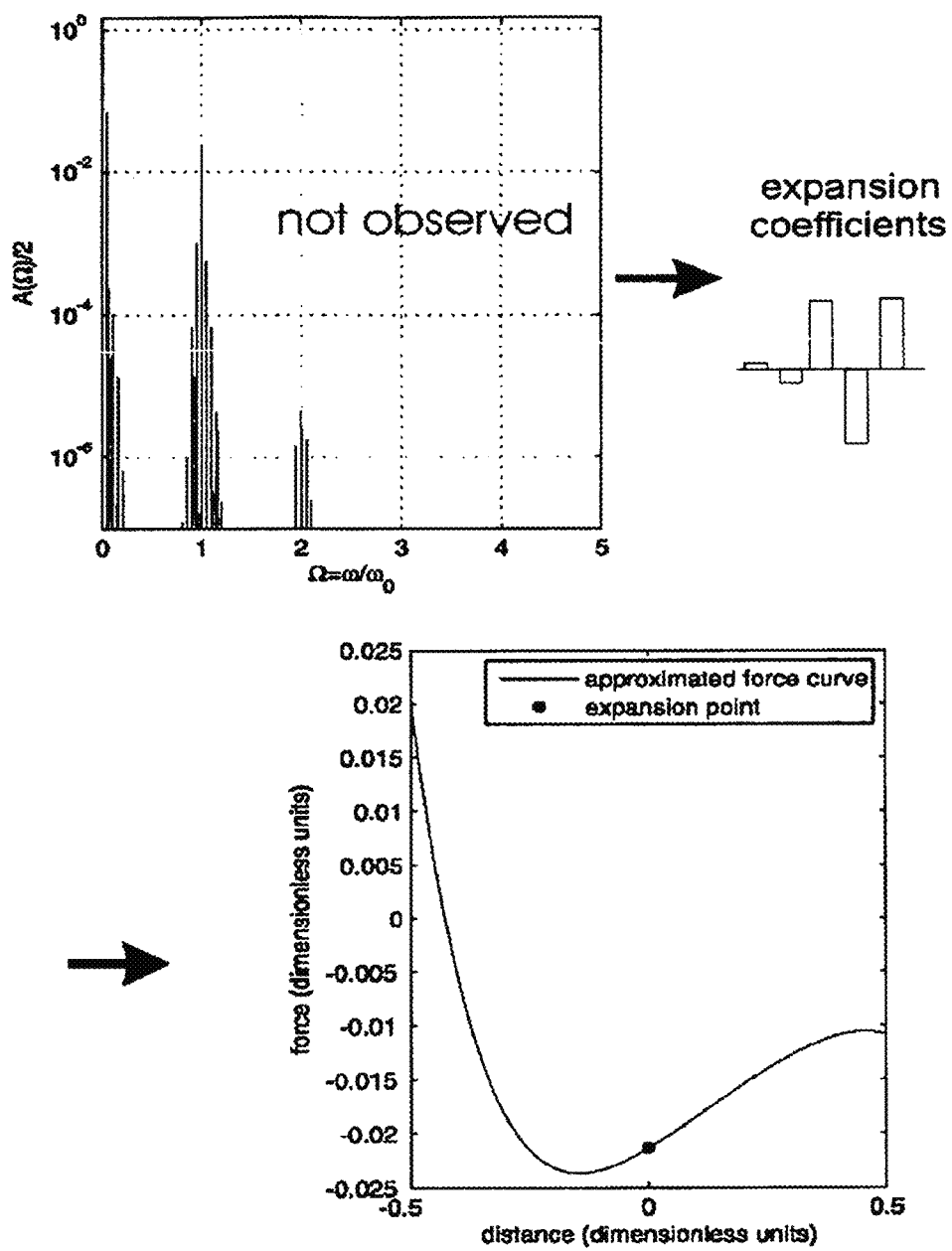
FIG. 8 Schematics of the strategy for finding the force-distance curves: From the measured intermodulation products one finds a finite number of expansion coefficients with which one can approximate the force-distance curve.

We will now discuss in more detail how the force-distance curve can be found with the strategy as sketched in FIG. 8. For many types of potentials the higher order expansion coefficients (those coefficients $g_j$ with a high value of j) become small (mainly due to a factor j! in the Taylor expansion). This allows us to restrict the sum in equation (*), which originally contains infinitely many terms, to a very good approximation to a finite number of terms. We call the number of these terms, i.e., the finite maximal value of j, at which we cut the sum, $j_{max}$. Then, the Taylor expansion $$\sum_j g_j \cdot z^j$$

(with z the space coordinate in appropriate units) with the sum restricted to terms from 1 to $j_{max}$, provides a good approximation of the force distance curve, close enough to the expansion point. The remaining task is to find the expansion coefficients $g_j$.

Equation (*) can be solved for the expansion coefficients $g_j$ only if $j_{max}$ is smaller or equal than half the number of IMPs which are measured above the noise level. The term one half applies when amplitudes and phases of the IMPs are measured. If only the amplitudes are measured, the number $j_{max}$ has to be smaller or equal than the number of intermodulation products in order to solve equation (*) for the coefficients. More specifically, if one observes $j_{max}$ intermodulation products and treats the coefficients $g_j$ as complex numbers (even though they are real), one can solve equation (*) as follows:

$$g_j = \sum_k \frac{(z_k - z_k^{drive})}{G_k^* H_{kj}^{-1}} \quad (**)$$

Here, the values of k are restricted to those numbers k for which one has observed an intermodulation product above the noise level at frequency $k*\Delta f$.

Thus, we made use of the fact that the complex amplitudes in the intermodulation spectrum are linear combinations of the coefficients of expansion $g_j$, as seen in equation (*). If $j_{max}$ terms are included in the power series expansion, and $j_{max}$ IMPs are measured in the response spectrum, the coefficients describing the potential can be determined by inversion of the matrix H, restricted to a $j_{max} \times j_{max}$ dimension. If more than $j_{max}$ intermodulation amplitudes and phases are observed, one can replace the inverse in equation (**) by a pseudo inverse, which amounts to finding a "best fit" for the coefficients $g_j$. While this solves the problem, we will name more details and possible improvements in the next section.

Another approach is to assume a functional form of the tip-surface force with M free parameters. If N complex amplitudes are measured in the spectrum and N>M, the problem is over determined. In this case, again, pseudo inverse methods can be used, which now amount to finding a "best fit" of the parameters used in the assumed functional form of the tip-surface force (instead of fitting to the expansion coefficients) to the measured response. Yet other methods involving Volterra Series analysis can be used to extract the form of the nonlinear tip-surface potential from the measured IMP spectrum. Finally, we can also use an approach where we measure (and save the information about) the cantilever distance as a function of time, calculate the force which must have acted at each certain time or time step, and combine these informations to extract the force distance curves. Such an approach has been used for torsional cantilevers [O. Sahin et al., Nature Nanotechnology 2, 507 (2007)], but this method has not been used for IM-AFM experiments yet. All the methods described above use the approach of dynamical systems theory in their analysis. A complete description of the dynamical system should also include the feedback of the AFM which is used in scanning. The inclusion of feedback in general complicates the analysis, introducing several new parameters and a new time scale. However, if the feedback operates much slower ("adiabatic") as compared to the time scale ¼ the feedback can be regarded as only a means of providing an equilibrium tip-surface distance which is mainly independent of the surface material, and can thus map the topography, without introducing further complications.

Details and Improvements for Finding the Expansion Coefficients:

Calculation of the Matrix Elements of H:

To find the expansion coefficients $g_j$ we must know the matrix H, or at least the matrix elements $H_{kj}$ for $j \le j_{max}$ and for those k for which we want to use the measured intermodulation products. These matrix elements are given as $$H_{k,j}(\{z_k\}) = \sum_{\substack{k_1,k_2,\ldots,k_j=-\infty \\ k_1+k_2+\ldots+k_j=k}}^{\infty} z_{k_1} z_{k_2} \cdots z_{k_j}$$

We developed the following efficient scheme to calculate them quickly: First, assign $H_{k,0}=0$ for all k except for k=0, where we assign $H_{0,0}=1$. Second, assign $H_{k,1}=z_k$ for all k. Then, the matrix elements with j>1 can be found via the formula $$H_{kj} = \sum_{k'} H_{k',(j-1)} z_{(k-k')},$$

where one continues by calculating those matrix elements with j=2 (for all k), then those with j=3, and so on, each time making use of the results with lower j which one already calculated.

The sum over k' (and the values of k in the expression "for all k" above) would for an exact calculation run from minus infinity to infinity. For any practical calculation one has to restrict oneself to a finite number of k-values. One should thus define a maximal value for k, called $k_{max}$, and restrict the sum to those k and k' which have values in the range from $-k_{max}$ to $k_{max}$. Terms $z_{k-k'}$, where k-k' is outside this interval, should be put to zero.

One can further enhance the speed of the calculation by restricting this interval further, or by using more than one but smaller intervals of k-values, e.g., restricting to only those values of k, where $z_k$ is stronger then a specified value (the sense of this strategy should be obvious when looking at the left part of FIG. 8).

Finally, one can make use of the fact that the complex numbers at the values k and −k are complex conjugated, i.e., $z_{-k} = z_k^*$, and analogous for the matrix elements $H_{kj}$. Thus, one can replace all appearances of $z_k$, where k is negative, by $z_{-k}^*$, and replace all occurrences of $H_{kj}$, where k is negative, by $H_{-k,j}^*$. This way one needs to save information only for positive k-values, which can for example reduce the memory needed in a device which performs such operations. This may be of importance for on-chip calculation.

Improving the Accuracy of the Recovered Expansion Coefficients

Clearly, one would like to gain the expansion coefficients as accurate as possible, i.e., as close to the real expansion coefficients of the probed potential as possible. One obstacle is the fact that the calculation of H requires, in principle, the knowledge of all $z_k$s. In practice, one can often find a reasonable approximation by taking only those $z_k$s which are observable and have the best signal-to-noise ratio, while setting $z_k$ to zero for those k, for which no intermodulation products (clearly above the noise floor) are observed at frequency $k\Delta f$.

We will now show how to decrease the error in the calculation of H (and thus also of the desired coefficients $g_j$ and the force-distance curve), when such an approximation is used. The idea is, to use the approximately calculated values of $g_j$ in order to approximately calculate those $z_k$, which are experimentally not easily accessible, or so only with huge noise. While it is not obvious that such an approach succeeds in increasing the accuracy, we found by numerical simulations that it indeed does.

Figure 9:
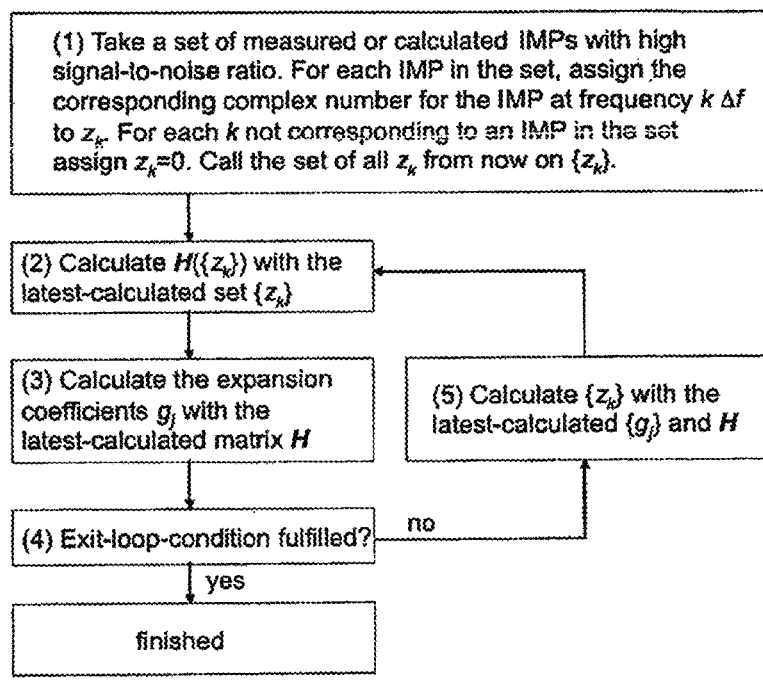
FIG. 9 Flow diagram of an algorithm which improves the accuracy of the expansion coefficients $g_j$ and the matrix H. This also allows for a higher accuracy of the force-distance curve. The diagram is partly shortened in the description—for details see text.

The algorithm for improving the derived expansion coefficients is symbolically shown as a flow diagram in FIG. 9. We consider the situation, where an intermodulation experiment has already been performed, and one has gained at least a few IMPs above the noise level.

In step (1) of the algorithm we divide the set of discrete frequencies $\{k\Delta f\}$, the corresponding IMPs, and the corresponding complex numbers $\{z_k\}$ into two sets. In the following we refer to both the complex numbers $z_k$ and the IMPs at frequency $k\Delta f$, to which these complex numbers belong, by their label k only. With this notation, this division is made such that the first of the new sets comprises all k for which an intermodulation product with high signal-to-noise ratio is available, and the other set where this is not the case. The decision whether a high signal-to-noise ratio is available depends on the conditions of the experiment. One strategy is, to call all intermodulation products with an absolute value higher than some previously specified value to have a high signal-to-noise ratio, possibly taking into account the height of the noise-level. While typically one should only take measured values into the first set, it can be useful to include calculated values. Specifically, the signal at the drive frequencies will change when the tip approaches the surface. However, for moderate closeness this signal will only change very little, and one can thus use the measured or calculated free signal in good approximation for the corresponding value $z_k$. To proceed, we set all complex numbers $z_k$ which are not in the first set (those which are not measured or have huge noise) to zero. In the following we combine the two sets again and call the combined set of complex numbers $\{z_k\}$. This set will now contain those $z_k$ which were set to zero and those with high signal-to-noise ratio which we kept unchanged.

In step (2) of the algorithm one calculates the matrix H, as described in the section "Calculation of the matrix elements of H", for the values of k chosen in this section and for j from 1 to $j_{max}$, using the set of $\{z_k\}$ which was calculated latest for the calculation.

In step (3) of the algorithm one calculates the expansion coefficients $g_j$ by equation () or the steps discussed directly after equation () [where this choice depends on $j_{max}$ and the number of intermodulation products originally available, as stated around equation (**)], using for H the matrix H which was calculated latest.

One could stop after step (3) in order to get an approximate result for the coefficients $g_j$. Alternatively, one can proceed to step (5) and use the (latest) calculated approximate result for the $g_j$ and the latest approximate result for the matrix H in order to calculate the set $\{z_k\}$ by making use of equation (*). We build a new set $\{z_k\}$ by keeping those $z_k$ which where measured and kept in step (1), but replacing all other $z_k$ (those which were calculated or put to 0 in step (1)). This way, we can achieve a better approximation for the set $\{z_k\}$ (recall that in the very first step some of the $z_k$ were even set to zero) and thus find a better approximation for H in the next step, namely restarting the loop with step (2) again.

This "correction loop" can be performed more than once in order to further improve the approximations. For practical calculations, one needs a condition for exiting this loop, and checking this condition is our step (4). If the condition is fulfilled, the algorithm is finished, otherwise we proceed with step (5) as discussed. The condition for finishing the loop could for example be that the loop has already been performed a certain number of times, or that the set of expansion coefficients did not change much (i.e. less than a given limit with a proper norm) during the last cycle of the loop, possibly with an additional upper limit of the number of loops which can be performed.

Finally, we note that in our empirical tests the whole algorithm for finding the expansion coefficients worked best when we had a weak coupling or when the value of $z_{k=0}$ is "measured" experimentally. The functioning can also be improved, specifically when stronger coupling is employed, when the value of the zero order coupling coefficient is known (achievable e.g. by independent measurement of the tip-surface force at the equilibrium 660 position of the tip) and then kept fixed in the algorithm.

CONCLUSION

We claim the invention of a new mode of scanning probe microscopy based on intermodulation measurement. A linear mechanical resonator with a sharp tip is driven with two frequencies and brought close to a surface. The interaction of the tip with the surface is a non-linear perturbation of the resonator, which causes the appearance of intermodulation products in the response of the cantilever. Measurement of these intermodulation products in force-distance sweeps allows one to extract the detailed form of the tip-surface interaction. When scanning the tip over the surface, images can be generated by measuring the intermodulation products which are very sensitive to subtle changes in the tip-surface interaction. We have demonstrated this new mode of scanning probe microscopy with an atomic force microscope, however, the general method of measuring and analyzing intermodulation products can be applied to many forms of scanning probe microscopy.

We also claim new modes of operation of intermodulation scanning probe microscopy. As compared to a previous provisional patent application by some of us [USPTO Provisional pat. No. 60990518 (EFS ID 2515284, confirmation nr. 8137)], this includes operation with more than two drive frequencies, and it includes operation with two drive frequencies, where not both drive frequencies are inside or close to the resonance frequency, as demonstrated in the named previous provisional patent application. We furthermore claim analysis methods for extracting useful information encoded in the intermodulation products. These analysis methods include methods which can be used for discriminating different compounds of the surface under study, even if the surface has a flat topography, and make use of the combined information encoded in more than one intermodulation product, and produce a more reliable result than by using only a single intermodulation product. These analysis methods furthermore include methods which find the expansion coefficients of the force or potential (or functions thereof) around a given distance, which allows to find relevant surface properties by making use of these expansion coefficients in a following step. These analysis methods furthermore include methods which (approximately) find the tip-surface force or tip-surface potential (or functions thereof), either by making use of the named expansion coefficients, or by assuming a functional form for the tip-surface potential and using the IMPs to determine parameters in the assumed functional form, or by making use of the observed time-resolved motion of the cantilever, deriving in addition to the distance-time information also a force-time information in order to find a force-distance curve. These analysis methods can be applied both to the modes of intermodulation scanning probe microscopy disclosed in the named previous provisional patent application and the new modes of operation disclosed here.

The invention claimed is:

1. A method for sensing a surface comprising:
    oscillating a resonator with a sharp tip where the resonator is brought close to the surface to be sensed,
    using a non-linear tip-surface interaction to generate intermodulation response of the resonator, and to measure the intermodulation products in the response, and thereby to obtain information about the surface,
    wherein the resonator is driven with two or more pure harmonic tones, and wherein a plurality of intermodulation products is generated near resonance from a combination of the two or more pure harmonic tones,
    and wherein the resonator is driven with two frequencies, $f_1$ and $f_2$, in the vicinity of the resonance, wherein the intermodulation products are of odd order ($f_{IM3}$, $f_{IM5}$, ...), and form a series of peaks in the response spectrum with spacing $n\Delta f = n(f_1-f_2)$.

2. The method of claim 1, wherein the intermodulation measurement is performed when scanning over the surface.

3. The method of claim 1, wherein the intermodulation response is measured for both the approach and retraction of the resonator from the surface.

4. The method of claim 1, wherein the plurality of intermodulation products is generated near resonance where the response of the resonator is enhanced, and wherein two drive frequencies are outside a resonance frequency.

5. The method of claim 1, wherein the plurality of intermodulation products is generated near resonance, where the response of the resonator is enhanced, and wherein more than two drive frequencies are used and all drive frequencies have a smallest common divisor.

6. The method of claim 1, further including: making an image of the surface from the amplitude of any individual intermodulation product.

7. The method of claim 1, further including:
    making an image of the surface, and the step of combining the information encoded in more than one intermodulation product, each of which is a complex value having both amplitude and phase, to improve the image contrast between areas of different composition and thus the accuracy in distinguishing different compounds on the surface.

8. The method of claim 1, further including:
    measuring and analyzing a frequency spectrum of the intermodulation response, to extract the nonlinear force distance curve for the tip-surface interaction while scanning in dynamic mode Atomic Force Microscope (AFM).

9. A controller for an atomic force microscope comprising: the controller performs the method of claim 1, wherein the controller further comprising a digital signal synthesis (DSS) module and a digital signal processing (DSP) module, whose functions can be realized with a field programmable gate array (FPGA) circuit, wherein the clocks of the DSS and DSP modules are synchronized to ensure that the waveform generation and sampling of the response is performed with exact integer multiples of the smallest common divisor of all drive frequencies.

10. A method comprising:
    use of the method of claim 1 to find a force-distance curve or potential between a tip and a surface, or functions thereof.

11. A method comprising:
    use of controller of claim 9 to find a force or potential between a tip and a surface, or functions thereof, the method for sensing a surface comprising:
    oscillating a resonator with a sharp tip where the resonator is brought close to the surface to be sensed, and
    using a non-linear tip-surface interaction to generate intermodulation response of the resonator, and to measure the intermodulation products in the response, and thereby to obtain information about the surface.

12. The method of claim 10, wherein the intermodulation measurement is performed when scanning over the surface.

13. The method of claim 10, wherein the intermodulation response is measured for both the approach and retraction of the resonator from the surface.

14. A computer program product comprising code which when run in a processor will cause the processor to perform analysis of the data generated by a method comprising:
    oscillating a resonator with a sharp tip where the resonator is brought close to the surface to be sensed,
    using a non-linear tip-surface interaction to generate intermodulation response of the resonator, and to measure the intermodulation products in the response, and thereby to obtain information about the surface;
    wherein said resonator is driven with two or more pure harmonic tones,
    wherein the resonator is driven with two frequencies, $f_1$ and $f_2$, in the vicinity of the resonance, wherein the intermodulation products are of odd order ($f_{IM3}$, $f_{IM5}$, ...), and form a series of peaks in the response spectrum with spacing $n\Delta f = n(f_1-f_2)$;
    wherein a plurality of intermodulation products is generated near resonance from a combination of the two or more pure harmonic tones,
    and wherein the processor performs the following:
    storing the amplitude and phase values of the measured intermodulation products generated at each point on the surface while scanning over the surface;
    processing the above mentioned amplitude and phase values at each point on the surface to improve the contrast between areas of different composition and thus the accuracy of distinguishing different components on the surface;
    analyzing the frequency spectrum of the intermodulation response at each point on the surface to extract the expansion coefficients of a nonlinear force distance curve for the tip-surface interaction, at that point on the surface; and plotting the resulting stored, processed, or analyzed data to form an image of the surface.

15. The computer program product of claim 14, wherein analyzing the intermodulation spectrum at each point on the surface to extract the expansion coefficients comprises iteratively improving the accuracy of approximation of the expansion coefficients.

16. A method for sensing a surface comprising:
oscillating a resonator with a sharp tip where the resonator is brought close to the surface to be sensed,
using a non-linear tip-surface interaction to generate intermodulation response of the resonator, and to measure the intermodulation products in the response, and thereby to obtain information about the surface,
wherein the resonator is driven with two or more pure harmonic tones, and wherein a plurality of intermodulation products is generated near resonance from a combination of the two or more pure harmonic tones,
and wherein one drive frequency, $f_2$, is at or close to resonance frequency and one drive frequency, $f_1$, is close to half of $f_2$, whereby only even order intermodulation products are produced near resonance.

17. A method for sensing a surface comprising:
oscillating a resonator with a sharp tip where the resonator is brought close to the surface to be sensed,
using a non-linear tip-surface interaction to generate intermodulation response of the resonator, and to measure the intermodulation products in the response, and thereby to obtain information about the surface,
wherein the resonator is driven with two or more pure harmonic tones, and wherein a plurality of intermodulation products is generated near resonance from a combination of the two or more pure harmonic tones,
and wherein the resonator is driven with two frequencies, $f_1$ and $f_2$, where one drive frequency, $f_1$, is at a low frequency and one drive frequency $f_2$ is placed on or very near resonance, whereby an intermodulation product spectrum of both odd and even order is generated near resonance.

* * * * *